INVENTORS:
ARTHUR H. DRELICH
BOBBY R. BOWMAN
BY
Alexander T. Kardos.
ATTORNEY.

3,692,653
SHAPED ARTICLES HAVING ENHANCED
SURFACE BONDING AND ADHESION
PROPERTIES AND IMPROVED ELONGA-
TION CHARACTERISTICS
Arthur H. Drelich, Plainfield, and Bobby R. Bowman,
East Brunswick, N.J., assignors to Johnson & Johnson
Filed Oct. 14, 1969, Ser. No. 866,221
Int. Cl. C08f 47/22, 3/08
U.S. Cl. 204—165                    3 Claims

ABSTRACT OF THE DISCLOSURE

Films, sheets, filaments, fibrous webs, and similar synthetic, organic, polymeric shaped articles having enhanced surface bonding and adhesion properties, excellent ink-printability with improved elongation characteristics which are obtained by exposing said shaped articles and structures, while in partially stretched or drawn and partially oriented form, to the action of an electrical corona discharge in an atmosphere containing a reactive gas.

---

Figure 1:
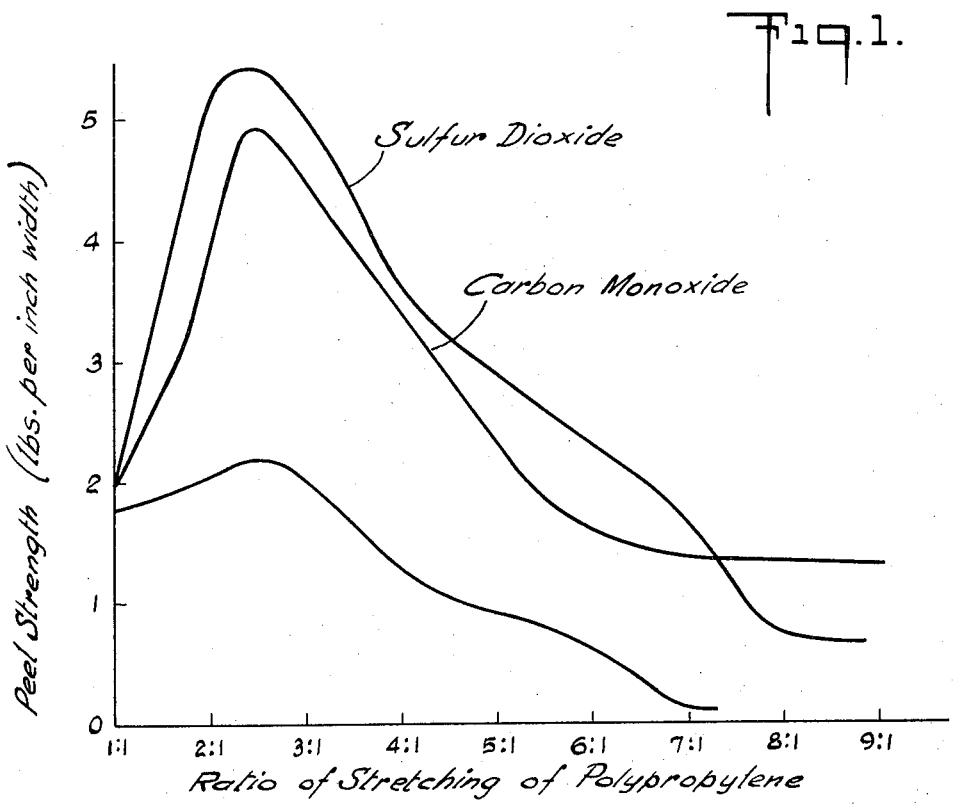

The present invention relates to films, sheets, filaments, fibrous webs, and similar synthetic, organic, polymeric shaped articles and structures having enhanced surface bonding and adhesion properties, excellent ink-printability as well as improved elongation characteristics.

Synthetic, organic, polymeric shaped articles and structures, either in fibrous forms such as fibrous webs, non-woven fabrics, filaments and the like, or in non-fibrous forms such as films, sheets, tapes, strips, and the like, are very well known in commerce and industry and have been used widely in many areas which run the gamut from packaging materials to textile fabrics and protective materials.

As such, these polymeric materials are exposed during usage to a wide variety of conditions, requirements and circumstances wherein they have need for particular and special physical properties and characteristics. Among such physical properties and characteristics may be listed surface bonding and adhesion capabilities, ink-printability, tensile strength, elongation characteristics, etc.

Such capabilities, properties and characteristics are particularly important, for example, in packaging materials wherein it is normally required not only (1) that the surface bonding and adhesion capabilities be sufficiently high to provide for adherence to other materials such as latex adhesives, printing inks, dyestuffs, pigments, etc.; but also (2) that the tensile strength be sufficiently great to withstand handling, folding, and other manipulation during use; and additionally (3) that the elongation characteristics be good enough as to provide sufficient stretching and yielding as to conform to the object or product being packaged.

It is therefore a principal purpose of the present invention to treat synthetic, organic, polymeric shaped articles and structures, such as, for example, polypropylene and polyethylene terephthalate polyester materials, in such a way as to improve and to enhance such bonding and adhesion, ink-printability, tensile and elongation properties and characteristics and to render the resulting materials more suitable for their intended purposes.

It has been discovered that such purpose may be realized by stretching or drawing and orienting such synthetic, organic, polymeric materials to a specified degree less than the extent to which they are normally commercially stretched or drawn and oriented during their manufacture, and then exposing such partially stretched or drawn and partially oriented polymeric materials to the action of an electrical corona discharge in an atmosphere containing a reactive gas.

Such purpose, and other purposes and objects of the present invention, as well as features and advantages thereof, will be disclosed in greater detail by reference to the following specification and claims and to the accompanying drawings wherein there are disclosed preferred embodiments of the inventive concept.

Figure 2:
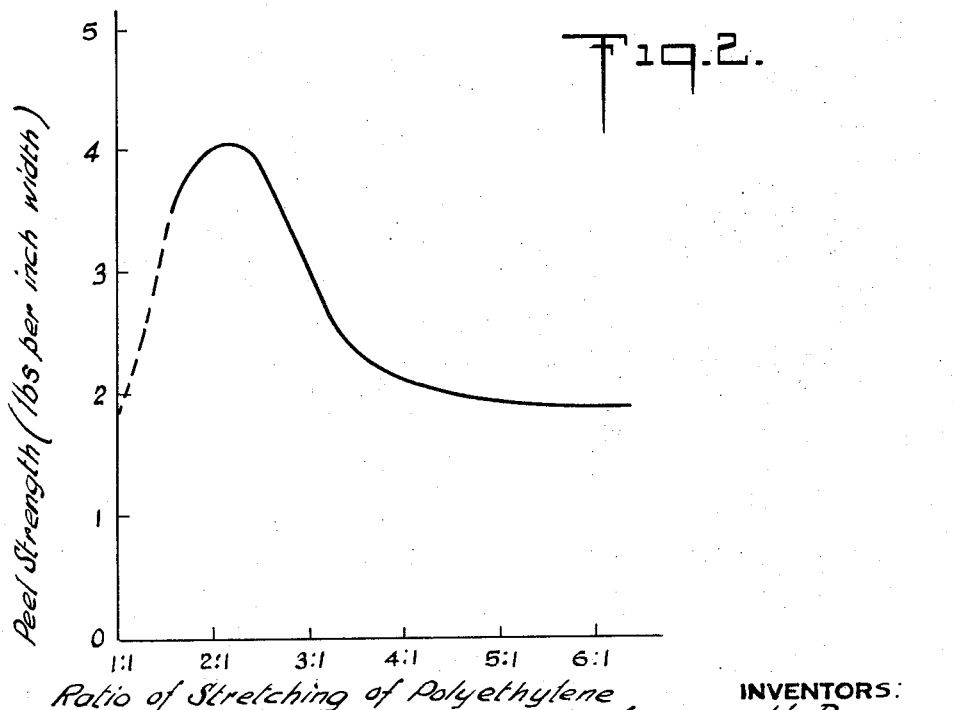

In the drawings:

FIG. 1 is a graph showing the relationship of the peel adhesion strength of a corona discharge treated polypropylene film to the ratio of its stretching or drawing and orientation during manufacture; and FIG. 2 is a graph showing the relationship of the peel adhesion strength of a corona discharge treated polyethylene terephthalate polyester film to the ratio of its stretching or drawing and orientation during manufacture.

The specific apparatus employed to expose the polymeric materials to the action of the electrical corona discharge does not relate basically to the essence of the invention and it is believed sufficient at this time to note that apparatus disclosed in co-pending, commonly assigned patent application entitled "Shaped Articles Having Improved Surface Properties and Corona Discharge Methods and Apparatus for Making the Same," filed concurrently herewith, would be well suited for the purposes of the present inventive concept. Other apparatus such as disclosed, for example, in U.S. Pat. 3,255,099, which issued June 7, 1966 would also be suitable.

The conditions of use and the details of operation of such apparatus are well described in this co-pending patent application and in this issued patent and further reference thereto is believed unnecessary.

The specific reactive gases which are employed may be any of the reactive gases disclosed therein, such as, for example, carbon monoxide which does not have an affinity for electrons, or the inorganic agents having a affinity for electrons such as disclosed in U.S. Pat. 3,255,099, or the organic vapors such as disclosed in U.S. Pat. 3,274,089 which issued Sept. 20, 1966, or any of the other well known reactive gases used in such prior art teachings. A few typical representative reactive gases are carbon monoxide, sulfur dioxide, sulfur trioxide, boron trifluoride, aluminum trichloride, chromyl chloride, hydrogen chloride, perchloric acid, chlorine, bromine, glycidyl methacrylate, acrylic acid, acrylonitrile, carbon tetrachloride, etc.

The specific polymeric materials which are treated in accordance with the principles of the present invention are illustrated, for example, by polypropylene and polyethylene terephthalate polyesters.

These polymeric materials are normally treated in the corona discharge apparatus at room temperatures. However, if desired, elevated treating temperatures of up to 150° F. or higher may be employed.

The weight and thickness of the polymeric materials may vary widely. Films as thin as about ½ mil or as thick as 10 mils are of greatest applicability. Sheets having thicknesses greater than 10 mils up to 20 mils or more are also applicable. Fibrous webs and nonwoven fabrics as light as about 150 grains per square yard are also of use and weights up to 1000 or more grains per square yard are also of use. Filamentary materials having deniers ranging from 1 denier or less up to 30 denier or more are similarly of use.

In preparing such polymeric materials for treatment by an electrical corona discharge in the presence of the reactive gas, the stretching or drawing and orienting which normally takes place during the commercial manufacture thereof must be decreased to a specific value less than the standard commercial degree. The reasons for such lesser degree of stretching or drawing and orientation will become clear from a reading of this disclosure.

Polymeric films, sheets, filaments, and the like, when they are first extruded and before they are deliberately and purposely stretched or drawn to create molecular orientation therein, are believed to have a relatively random condition of molecular orientation. As these materials are stretched or drawn, the thickness, size of diameter thereof are reduced and the molecules tend to arrange themselves parallel to the axis or direction of stretching or drawing and to pack into a tighter bundle. The polymeric materials are thus elongated and molecularly oriented and become much stronger, stiffer, and possess improved optical properties. At the same time, there is a decrease in the amount of residual elongation properties. The degree of commercial stretching or drawing varies considerably for each particular polymeric material. The lesser degree to which the polymeric materials of the present invention are stretched or drawn also varies as to the particular polymeric material involved.

During the initial extrusion of such polymeric films, sheets, filaments, and the like, regardless of whether it is a melt spinning, dry spinning, or other process, there is, of course, a slight unavoidable degree of extrusion die drawing or stretching which sets up and partially crystallizes the structure of the polymeric materials being manufactured. Subsequent to this initial formative drawing or stretching, there is an additional commercial drawing or stretching whereby the structural orientation of the polymeric material is increased, its tensile strength improved its flexibility extended, and its residual elongation decreased.

The degree of drawing or stretching referred to herein is concerned with this latter stage of drawing or stretching and the numerical values assigned thereto do not include the initial extrusion and formative drawing or stretching which takes place during the manufacture of the films, sheets, filaments, and the like.

For example, in dealing with polypropylene which is normally commercially stretched at least about 5 times its original length up to 7 times, and sometimes 9 times its original length, subsequent to its initial extrusion, the degree of stretch for the polypropylene materials of the present invention is kept between the ranges of at least about 1½:1 to a maximum of 4:1. Below this range and above this range, the benefits and advantages of the present invention are not realized.

This is particularly true for the drawing and stretching range greater than 5:1. In this range, the desirable elongation characteristics are decreased dramatically because of the increased drawing and orientation. Additionally, the improvement in the surface bonding and adhesive properties due to the corona discharge treatment is also decreased markedly.

Reference to FIG. 1 will reveal how the peel adhesive strength of unoriented 1:1 polypropylene is initially not acceptable but reaches acceptable values at a stretching ratio of at least about 1½:1, improves steadily to a peak or maximum at about 2½:1, and then falls off to pass out of the acceptable range at a maximum of 4:1. The essential factor to keep in mind is that the polypropylene cannot be completely undrawn or unoriented but must be stretched and oriented to some degree, but must not be stretched into the higher commercial stretching ranges.

With reference to polyethylene terephthalate polyester which is normally commercially stretched at least 3:1 and sometimes as high as about 5:1 or higher, subsequent to the initial extrusion thereof, the degree of stretch for the polyethylene terephthalate polyesters of the present invention is kept at a lower ratio between at least about 1½:1 and less than 3:1. The essential factor to keep in mind again is that the polyethylene terephthalate polyester cannot be completely undrawn or unoriented but must be stretched and oriented to some degree, but must not be stretched into the higher commercial stretching ranges.

The stretching or drawing is normally accomplished by unwinding the polymeric materials from a roll at a given speed and then rewinding the polymeric materials on a rewind roll which is operated at a predetermined greater speed.

The temperature of stretching or drawing may take place either cold or at elevated temperature (hot drawn). In the case of polyethylene terephthalate polyester materials which are especially amorphous, weak and have an almost random configuration of polymer chain units, stretching or drawing is best performed just above its glass-rubber transition temperature (above 80° C.). This orients the long chain polymer molecular, induces crystallinity, and gives stability and strength to the resulting materials.

When a film, sheet or similar material is treated in accordance with the principles of the present invention, it is to be noted that both surfaces or sides of the film or sheet are chemically modified and their surface physical properties and characteristics changed. The central or internal portions of the film or sheet, however, remain basically unmodified. When a fibrous web or similar open or porous material is treated by the principles of the present invention, substantially the complete peripheral surfaces of the individual fibers thereof appear to be chemically modified and their surface physical properties and characteristics changed.

The exact reaction mechanism by which the surface modifications of the polymeric materials takes place is not completely or precisely understood at the present time. However, it is believed that, under the influence of the energy of the electrical corona discharge and the effect of the free radical liberation thereat, the reactive gas chemicaly reacts with the polymeric material at the surfaces thereof to form a relatively shallow layer of a different chemical species which possesses different surface properties and characteristics than those possessed previously by the polymeric material, itself. Such relatively shallow layer may be on the order of only a few hundred molecules thick but it is sufficient to affect the surface properties and characteristics of the polymeric material. Most likely, the outermost molecules are reacted the most, with molecules located farther from the surface being reacted less frequently, with evidence indicating that no substantial reaction takes place a few thousand molecules distance from the surfaces of the polymeric material.

By thus altering surface molecules only, such surface properties as adhesion, bonding, wetting, ink printability wicking, fluid absorbency, etc., can be significantly altered wihout signifiantly changing the bulk polymer properties and characteristics.

The inventive concept will be described in greater particularity and detail in the following specific examples which set forth preferred embodiments of fthe inventive concept in illustrative but not limitative manner.

In these examples, references to percentages or proportions of gases are given by volume. Also, in these examples, reference will be made to a "Peel Adhesion Test." This is a test for the surface adhesion power of a plastic film or similar sheet-like material. The subject film is fastened flat on a surface, such as a glass plate. A clean, bleached cotton fabric (80 x 80 square construction) is dipped into an aqueous polyvinyl acetate latex dispersion, the excess dispersion is removed, and the fabric placed onto the flat film. The composite structure is rolled with a press roller to remove all surplus polymer latex. The composite structure is dried in air and then heat-cured at about 230° F. in a curing oven for about three minutes.

The cured composite structure is then removed from the curing oven and allowed to cool in air. It is then removed from the plate glass and is cut into strips 1 inch wide and 4 inches long. The composite structure is peeled apart by hand approximately only 1 inch and the peeled ends are placed in the clamping jaws of an Instron tensile tester. The jaws move away from each other at a constant rate of 12 inches per minute, and the force required to delaminate this composite structure is recorded on a chart, according to the customary practice with an Instron tester. The configuration of the composite structure during the peel test somewhat generally resembles the letter "T," and this test is commonly also called the "T Peel Test."

It is to be appreciated that the term "bonding and adhesion' 'is used in its broad sense and covers bonding and adhesion to other materials in all forms including other polymeric materials, adhesives, bonding agents, printing inks, dyestuffs, pigments, etc.

EXAMPLE I

Hot drawn polypropylene film, 2-mils in thickness, having the various stretching or drawing ratios set forth in the table below are exposed to an electrical corona discharge in the presence of 10 percent by volume of sulfur dioxide as the reactive gas and 90 percent by volume of nitrogen as a diluent carrier gas. Peel adhesion tests are carried out, using an aqueous polyvinyl acetate latex dispersion as the bonding agent. The results are as follows:

TABLE I

| Stretch ratios: | Peel adhesion strength (lbs. per inch width) |
|---|---|
| 1:1 (undrawn) | 1.9 |
| 2:1 | 5.1 |
| 3:1 | 5.0 |
| 4:1 | 3.4 |
| 5:1 (commercial) | 2.9 |
| 6:1 (commercial) | 2.1 |
| 7:1 (commercial) | 1.7 |
| 8:1 | 0.7 |
| 9:1 | 0.7 |

These results are illustrated in the curve entitled "Sulfur Dioxide" in FIG. 1 and reveal that unorientd polypropylene (1:1) is unacceptable; commercial polypropylene (5:1 to 7:1) is poor; special highly stretched polypropylene (8:1 to 9:1) is completely unsatisfactory; whereas the specific range of from about 2:1 to 4:1 is excellent. Polypropylene films in such range have excellent surface bonding and adhesion properties, have excellent elongation, and are especially suitable for packaging purposes.

It is also to be observed that delamination or failure during the peel test for the drawing ranges from about 2:1 to 4:1 takes place primarily in the adhesive resin bonding agent, itself, or occasionally in the polypropylene film, itself, rather than in the interfaces between the resin bonding agent and the film or sheet material. Such failure in the resin bonding agent, or the film itself, indicates the excellent bonding adhesion which is taking place at the surface of the polypropylene film. In contrast thereto, delamination or failure during the peel test for the higher drawing ranges, and particularly greater than 5:1, apparently takes place at the interface between the resin bonding agent and the polypropylene film.

This of course, indicates that the bonding which is taking place at the surface of the polypropylene film is inferior and is weaker than the strength of the resin bonding agent, itself or of the polypropylene film, itself. This would appear to establish that a different physical phenomenon and a different chemical reaction mechanism is taking place at the surface of the polypropylene for the drawing ranges of from about 2:1 to 4:1, as contrasted to the drawing range greater than 5:1.

EXAMPLE II

The procedures of Example I are followed substantially as set forth therein except that carbon monoxide is the reactive gas. The results of the peel adhesion test are also shown graphically in the curve entitled "Carbon Monoxide" in FIG. 1 and are as follows:

TABLE II

| Stretch ratio: | Peel adhesion strength (lbs. per inch width) |
|---|---|
| 1:1 (undrawn) | 1.9 |
| 2:1 | 3.5 |
| 3:1 | 4.5 |
| 4:1 | 3.4 |
| 5:1 (commercial) | 2.4 |
| 6:1 (commercial) | 1.3 |
| 7:1 (commercial) | 1.4 |
| 8:1 | 1.3 |
| 9:1 | 1.3 |

These figures reveal that unoriented polypropylene 1:1 is unacceptable; commercial polypropylene (5:1 to 7:1) is poor; special highly stretched polypropylene (8:1 to 9:1) is also poor; whereas the specific range of 2:1 to 4:1 is excellent. Polypropylene films in such range have excellent surface bonding and adhesion properties, have excellent elongation, and are especially suitable for packaging purposes.

Again, it is observed that delamination or failure during the peel test takes place primarily in the resin bonding agent, itself, or in the polypropylene film, itself, for the drawing ranges from about 2:1 to 4:1, rather than at the interface between the resin bonding agent and the film. For the drawing ranges greater than 5:1, the failure appears to take place at the interface between the resin bonding agent and the polypropylene film.

EXAMPLE III

The procedures of Example II are followed substantially as set forth therein except that a self-cross linking acrylate ester resin HA-8 (Rohm & Haas) is used as the adhesive agent in the peel adhesion test. This resin is well known to be weaker than the polyvinyl acetate resin used in Examples I and II. The results of the peel adhesion test are also shown in the lower most curve in FIG. 1 and are as follows:

TABLE III

| Stretch ratio: | Peel adhesion stretch (lbs. per inch width) |
|---|---|
| 1:1 (undrawn) | 1.7 |
| 2:1 | 2.0 |
| 3:1 | 2.0 |
| 4:1 | 1.6 |
| 5:1 (commercial) | 0.93 |
| 6:1 (commercial) | 0.87 |
| 7:1 (commercial) | 0.05 |

These results again reveal the superiority of the preferred stretching ranges below the commercial drawing or stretching ranges.

Again, it is observed that delamination or failure during the peel test takes place primarily in the resin bonding agent, itself, or in the polypropylene film, itself, for the drawing ranges from about 2:1 to 4:1, rather than at the interface between the resin bonding agent and the film. For the drawing ranges greater than 5:1, the failure appears to take place at the interface between the resin bonding agent and the polypropylene film.

EXAMPLE IV

The procedures of Example I are followed substantially as set forth therein except that 2-mil polyethylene terephthalate polyester is used. The results of the peel adhesion tests are shown in the curve in FIG. 2 and are as follows:

TABLE IV

| Stretching ratio: | Peel adhesion tests (lbs. per inch width) |
|---|---|
| 2:1 | 3.9 |
| 3:1 | 2.6 |
| 4:1 | 2.2 |
| 5:1 | 1.9 |

These results are illustrated in FIG. 2 of the drawings which reveal that commercial polyethylene terephthalate polyester (greater than 3:1) is poor; whereas the specific range from about 2:1 to 3:1 is excellent. Polyethylene terephthalate films in such range have excellent surface bonding and adhesion properties and improved elongation characteristics whereby they are especially suitable for packaging purposes.

Again, it is observed that delamination or failure during the peel test takes place primarily in the resin bonding agent, itself, or in the polyester film, itself, for the drawing ranges from 2:1 to 4:1, rather than at the interface between the resin bonding agent and the film. For the drawing ranges greater than 4:1, the failure appears to take place at the interface between the resin bonding agent and the polyester film.

Although the preceding examples have been described in particularity with reference to specific materials and specific working conditions, it is to be appreciated that such is employed to illustrate the invention but not to limit it except as defined by the scope of the appended claims.

We claim:

1. Shaped synthetic, organic, polymeric materials selected from the group consisting of partially stretched or drawn and partially oriented polypropylene and polyethylene terephthalate polyesters having: excellent peel adhesion strength, surface bonding and adhesion properties and elongation characteristics; a degree of partial stretching or drawing and orientation less than the standard commercial stretching or drawing and orientation for such materials and being in the range of from about 1½ times to about 4 times its original extruded length for said polypropylene materials and from about 1½ times to about 3 times its original extruded length for said polyethylene terephthalate materials; peel adhesion strengths of at least about 3 pounds per inch width of said shaped materials when in 2-mil thickness film form and excellent residual elongation characteristics; both of the surfaces of said shaped materials being modified due to the action of an electrical corona discharge thereon while in partially stretched or drawn and partially oriented form in an atmosphere containing a reactive gas.

2. Shaped materials as defined in claim 1 wherein the surfaces of the shaped materials were reacted with carbon monoxide.

3. Shaped articles as defined in claim 1 wherein the surfaces of the shaped materials were reacted with sulfur dioxide.

References Cited

UNITED STATES PATENTS

| | | | |
|---|---|---|---|
| 2,859,481 | 11/1958 | Kaghan et al. | 204—168 |
| 3,255,099 | 6/1966 | Wolinski | 204—168 |
| 3,462,335 | 8/1969 | Hansen et al. | 204—168 X |
| 3,333,032 | 7/1967 | Dickinson | 204—22 |
| 3,376,208 | 4/1968 | Wood | 204—168 |
| 3,424,735 | 1/1969 | Buchheister et al. | 260—93.7 |

F. C. EDMUNDSON, Primary Examiner

U.S. Cl. X.R.

161—164; 204—168